United States Patent
Cheng et al.

(10) Patent No.: US 10,107,413 B2
(45) Date of Patent: Oct. 23, 2018

(54) SELF-CONTAINED GATE VALVE COLUMN LOADING PREVENTION MECHANISM

(71) Applicant: GE Oil & Gas Pressure Control LP, Houston, TX (US)

(72) Inventors: Samuel Heung Yeung Cheng, Houston, TX (US); Andrew Browne Helvenston, Houston, TX (US); Keith M. Adams, Houston, TX (US); Lloyd R. Cheatham, Houston, TX (US); Travis Kyle McEvoy, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 77 days.

(21) Appl. No.: 15/159,253

(22) Filed: May 19, 2016

(65) Prior Publication Data
US 2017/0335976 A1 Nov. 23, 2017

(51) Int. Cl.
*F16K 31/50* (2006.01)
*F16K 3/314* (2006.01)

(52) U.S. Cl.
CPC ............ *F16K 31/508* (2013.01); *F16K 3/314* (2013.01)

(58) Field of Classification Search
CPC ........ F16K 3/02; F16K 3/0218; F16K 3/0254; F16K 31/508; F16K 31/50; F16K 3/314
USPC .................. 251/326–329, 193–204
See application file for complete search history.

(56) References Cited

U.S. PATENT DOCUMENTS

| | | | | |
|---|---|---|---|---|
| 963,230 A | * | 7/1910 | Libby | F16K 31/508 251/266 |
| 968,944 A | * | 8/1910 | Henry | F16K 31/508 251/266 |
| 1,221,052 A | * | 4/1917 | Henry | F16K 31/508 251/266 |
| 1,300,200 A | | 4/1919 | Snow | |
| 2,462,809 A | | 2/1949 | De Craene | |
| 3,223,380 A | * | 12/1965 | Hochmuth | F16K 3/30 251/284 |
| 3,463,446 A | * | 8/1969 | Natho | F16K 3/314 251/175 |
| 3,486,734 A | | 12/1969 | Works et al. | |

(Continued)

OTHER PUBLICATIONS

International Search Report and Written Opinion issued in connection with corresponding PCT Application No. PCT/US2017/033677 dated Jul. 25, 2017.

*Primary Examiner* — Reinaldo Sanchez-Medina
*Assistant Examiner* — David Colon Morales
(74) *Attorney, Agent, or Firm* — Hogan Lovells US LLP (57) ABSTRACT

A valve assembly includes a valve body with a flow passage intersected by a valve cavity. A valve member is axially movable in the valve cavity between a closed position and an open position, the valve member having an opening that registers with the flow passage when the valve member is in the open position. A valve stem is threadingly connected to the valve member, the valve stem rotatable to move the valve member between the closed position and the open position. A collar assembly is located within a slot of the valve member and circumscribes the valve stem, the collar assembly having an annular collar shoulder. The valve stem has an annular load shoulder sized to engage the collar shoulder, limiting axial movement of the valve member.

14 Claims, 5 Drawing Sheets

(56) References Cited

U.S. PATENT DOCUMENTS

| | | | | |
|---|---|---|---|---|
| 3,770,247 | A * | 11/1973 | Nelson | F16K 31/508 251/214 |
| 3,958,592 | A * | 5/1976 | Wells | F16K 3/0254 137/237 |
| 4,138,091 | A * | 2/1979 | McGee | F16K 3/314 251/196 |
| 4,433,827 | A * | 2/1984 | Redmon | F16K 3/0254 251/191 |
| 4,541,608 | A * | 9/1985 | Forester | F16K 3/0254 251/191 |
| 4,651,973 | A * | 3/1987 | Oliver | F16K 3/316 251/267 |
| 4,658,848 | A * | 4/1987 | Meyer | F16K 3/0254 137/72 |
| 5,505,429 | A * | 4/1996 | Bardini | F16K 3/314 251/326 |
| 5,829,734 | A | 11/1998 | Freudendahl | |
| 6,401,747 | B1 * | 6/2002 | Cain | F16K 3/0254 137/329.03 |
| 6,598,849 | B2 * | 7/2003 | Hoang | E21B 21/10 251/62 |
| 7,255,328 | B2 * | 8/2007 | Hunter | F16K 3/02 137/375 |
| 7,309,058 | B2 * | 12/2007 | Hunter | F16K 3/02 251/214 |
| 7,481,239 | B2 * | 1/2009 | McGuire | F16K 3/0236 137/242 |
| 7,562,859 | B2 * | 7/2009 | Lam | F16K 3/0227 251/190 |
| 7,819,385 | B2 * | 10/2010 | Hunter | F16K 3/0254 251/264 |
| 8,690,124 | B2 * | 4/2014 | Parks | F16K 3/02 251/327 |
| 2003/0116742 | A1 * | 6/2003 | Anderson | F16K 31/508 251/326 |
| 2004/0216888 | A1 * | 11/2004 | Schmidt | F16K 31/05 166/377 |
| 2012/0261603 | A1 * | 10/2012 | Kahn | F16K 3/0236 251/328 |
| 2012/0318528 | A1 * | 12/2012 | Wolfe | F16K 3/0263 166/373 |

* cited by examiner

SELF-CONTAINED GATE VALVE COLUMN LOADING PREVENTION MECHANISM

BACKGROUND

1. Field of the Disclosure

The present disclosure relates in general to valves and more particularly, to valve stops for limiting axial movement of valve members.

2. Description of Related Art

A valve has a body with a flow passage extending through it. A valve cavity intersects the flow passage, and seat rings are located at the upstream and downstream points of intersection. An actuator, which may be mechanical, hydraulic or electrical, moves a valve member within the valve cavity between open and closed positions. The valve member has an aperture through it. When in the open position, the aperture registers with the flow passage. In the closed position, a seal surface on the valve member contacts the downstream seat ring. The upstream pressure exerts a force pushing the seal surface into tight sealing engagement.

When the operator closes the valve assembly by rotating the valve stem in a closing direction, the bottom of the valve member can contact a bottom surface of the gate cavity. However the valve member should be free to float in order to provide a tight sealing engagement under all load conditions. If the bottom of the valve member is in contact with the bottom surface of the gate cavity the valve member could be prevented from having adequate float to form a tight sealing engagement. In certain current systems, the operator can back the valve member off of the bottom of the valve cavity by rotating the valve stem in an opening direction. However, this adds an extra step in the process of operating the valve and if not done properly, can compromise the functionality of the valve.

SUMMARY OF THE DISCLOSURE

Embodiments of the current disclosure provide a valve assembly with a valve member that can be moved to a fully extended position where an end of the valve member is not in contact with an internal surface of the valve cavity. Therefore an operator does not have to back off the valve member in order to ensure that the valve member can float within the valve cavity. The end of the valve member is free of contact with the opposite facing surface of the valve cavity in both the open and closed positions.

In an embodiment of the current disclosure, a valve assembly includes a valve body with a flow passage intersected by a valve cavity. A valve member is axially movable in the valve cavity between a closed position and an open position, the valve member having an opening that registers with the flow passage when the valve member is in the open position. A valve stem is threadingly connected to the valve member, the valve stem rotatable to move the valve member between the closed position and the open position. A collar assembly is located within a slot of the valve member and circumscribes the valve stem, the collar assembly having an annular collar shoulder. The valve stem has an annular load shoulder sized to engage the collar shoulder, limiting axial movement of the valve member.

In an alternate embodiment of the current disclosure, a valve assembly includes a valve body with a flow passage intersected by a valve cavity. The valve assembly also includes a gate with a valve axis, and a gate body, the gate body having a downstream face, and an upstream face on an opposite side of the gate body from the downstream face. The gate is axially movable in the valve cavity between a closed position and an open position. The gate has a gate opening that registers with the flow passage when the gate is in the open position. A valve stem is threadingly connected to the gate, the valve stem rotatable to move the gate between the closed position and the open position. A collar assembly is located within a slot of the gate and circumscribes the valve stem, the collar assembly having an annular collar shoulder. The valve stem has an annular load shoulder sized to selectively engage the collar shoulder, limiting axial movement of the gate. An end surface of the gate is free of contact with an opposite facing surface of the valve cavity when the load shoulder engages the collar shoulder.

In yet another alternate embodiment of the current disclosure, a method of operating a valve assembly includes providing a valve body with a flow passage intersected by a valve cavity, a valve member positioned within the valve cavity, a valve stem threadingly connected to the valve member, and a collar assembly located within a slot of the valve member and circumscribing the valve stem. The collar assembly has an annular collar shoulder. The valve stem is rotated to move the valve member axially within the valve cavity between a closed position and an open position. The valve member has an opening that registers with the flow passage when the valve member is in the open position. Axial movement of the valve member is limited with an annular load shoulder of the valve stem that is sized to engage the collar shoulder.

BRIEF DESCRIPTION OF DRAWINGS

Some of the features and benefits of the present disclosure having been stated, others will become apparent as the description proceeds when taken in conjunction with the accompanying drawings, in which.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION OF DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
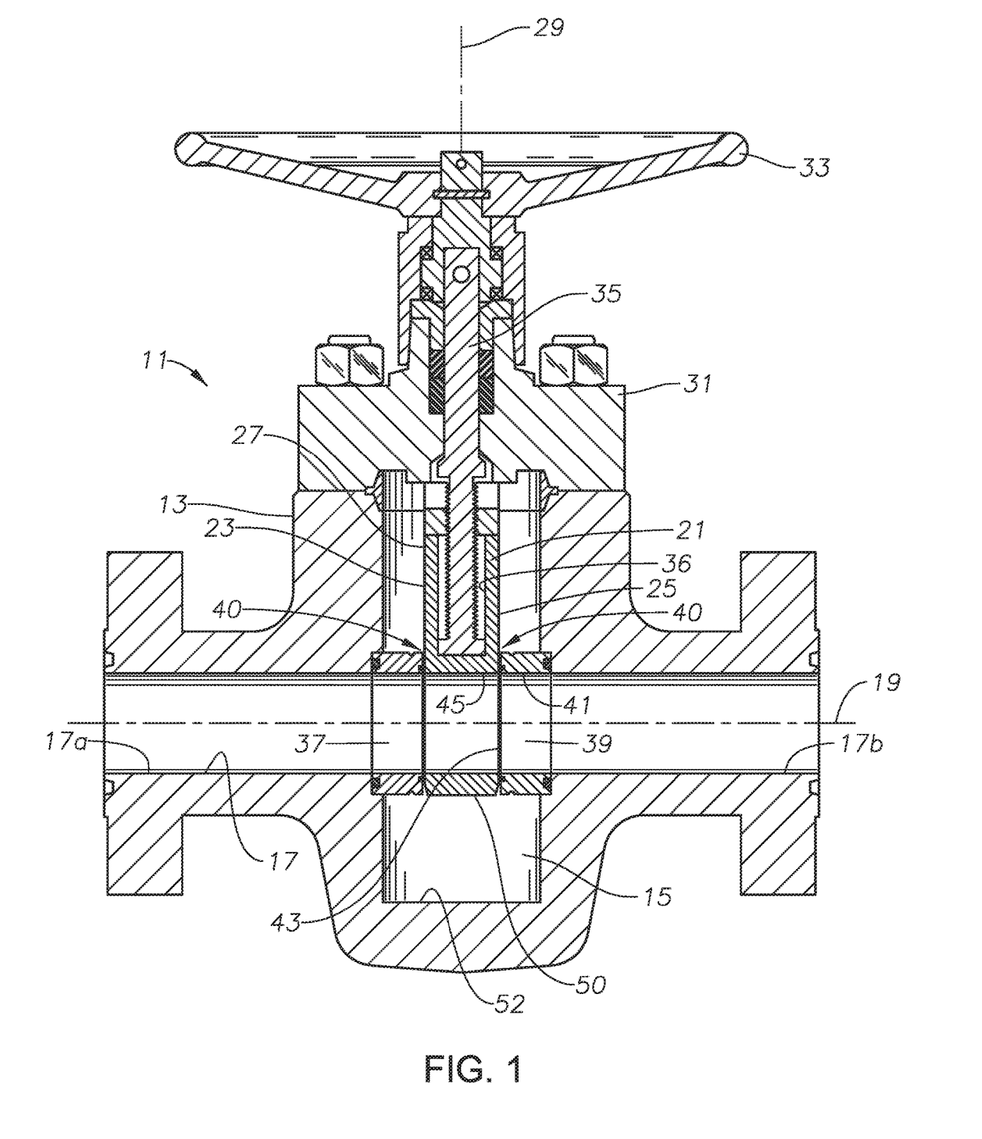
FIG. 1 is a section view of a valve assembly in accordance with an embodiment of this disclosure.

Referring to FIG. 1, valve assembly 11 includes valve body 13 with valve cavity 15 located therein. Valve assembly 11 can be, for example associated with a wellhead assembly that is disposed over a well. The wellhead assembly can include a wellhead housing, a production tree over the housing and flow lines connected to the tree or the wellhead assembly (not shown). The flow lines and wellhead assembly can include embodiments of valve assembly 11 described herein. Valve assembly 11 can also be used for regulating or turning off or on fluids, such as a fracturing fluid, that are designated for entry into the wellhead assembly. The wellhead assembly can be at the surface or can be subsea.

A flow passage 17 is defined by flow passages 17a, 17b, which extend through valve body 13, are coaxial with each other about lateral axis 19 and intersect valve cavity 15. A valve member 21 is carried within valve cavity 15. Valve member 21 is moveable along valve axis 29 for movement in a plane that is generally perpendicular to lateral axis 19 of flow passages 17a, 17b.

In the example of FIG. 1, valve member 21 is a gate with a gate body 27 that is generally rectangular and has upstream and downstream faces 23, 25 on opposite sides of gate body 27. Depending on the direction of fluid flow, either face 23, 25 will be the upstream side. For purposes of this disclosure, face 23 will be described as the upstream side, however if the fluid flow was reversed, face 25 would be the upstream side. Although embodiments of this disclosure are described with fluid flow in one direction, it can be understood that embodiments of this disclosure can function equally with fluid flow in either direction.

Figure 3:
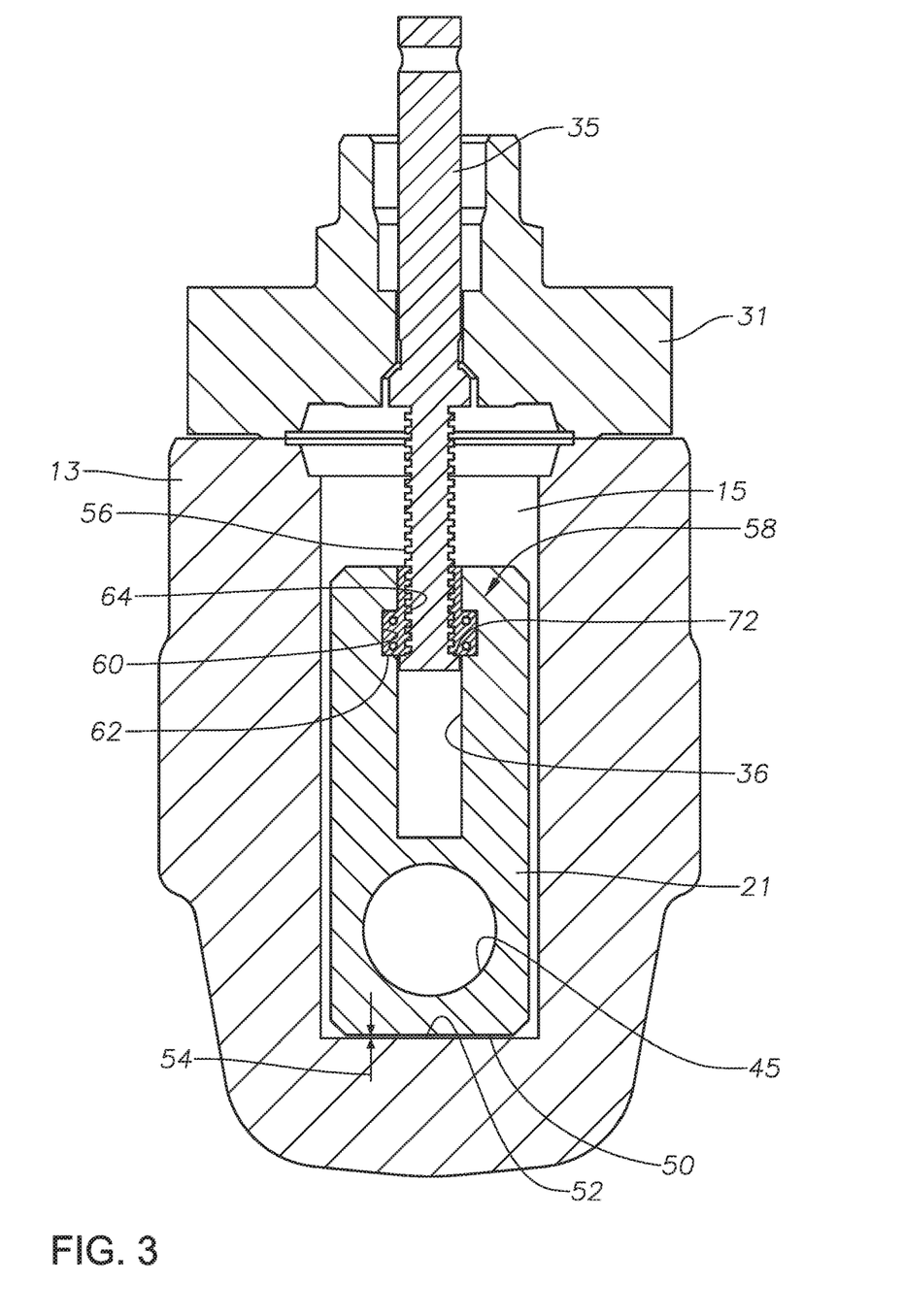
FIG. 3 is section view of a valve assembly, in accordance with an embodiment of this disclosure, shown with the valve member in the closed position.

Valve member 21 can be moved axially within valve cavity 15 along valve axis 29 between a closed position and an open position. Valve member 21 can be moved by rotation of valve stem 35. Bonnet 31 is mounted to the upper end of valve body 13. A hand wheel 33 can be used to cause valve stem 35 to rotate. Alternately, an electric actuator could be utilized, or in certain cases pneumatic or hydraulic actuators, to cause rotational movement of valve stem 35. Valve stem 35 can be centered around valve axis 29 and as valve stem 35 is rotated about valve axis 29, valve member 21 moves axially along valve axis 29. In the embodiment of FIG. 1, valve member 21 is in the open position when valve stem 35 extends a maximum distance into bore 36 of valve member 21, and valve member 21 would be in a closed position when valve stem 35 extends a minimum distance into bore 36 of valve member 21 (FIG. 3). In alternate embodiments, valve member 21 can instead be in the open position when valve stem 35 extends a minimum distance into bore 36 of valve member 21 and valve member 21 could be in a closed position when valve stem 35 extends a maximum distance into bore 36 of valve member 21.

A stem seal located in bonnet 31 seals around valve stem 35 and seals pressure and fluids within valve cavity 15. Although embodiments of this disclosure describe valve member 21 as a gate, in alternate embodiments valve member 21 can instead be another valve type that moves between open and closed positions along valve axis 29 of the valve stem 35.

A metal seat ring 37, 39 can be located between each face 23, 25 and valve body 13, at the intersection of each flow passage 17a, 17b, respectively, with valve cavity 15. Seat rings 37, 39 have holes therethrough that register with the flow passages 17a, 17b. Valve member 21 has a flow passage or opening 45 that registers with flow passages 17a, 17b and holes 41 in seat rings 37, 39 when valve member 21 is in an open position. The inner diameter of opening 45 is typically the same as holes 41 in seat rings 37, 39 and flow passages 17a, 17b. In the closed position, opening 45 is not aligned with the flow passages 17a, 17b and the valve member 21 instead blocks the flow passages 17a, 17b. When valve member 21 is in the closed position, the fluid forces on upstream face 23 will cause the downstream face 25 of valve member 21 to seal against the seal surface of downstream seat ring 39.

Each seat ring 37, 39 has an inward directed seat ring face 43 that is proximate to the faces 23, 25. The distance between the seat ring faces 43 of seat rings 37, 39 can be slightly greater than the thickness of valve member 21. A sealing interface 40 between a face 23, 25 and seat ring face 43 occurs when the gap between the sealing components of face 23, 25 and seat ring face 43 becomes minimal, or nonexistent. This typically occurs between downstream face 25 and seat ring face 43. In such an embodiment, there may be times when upstream face 23 does not seal against the seal surface of seat ring 37 and fluids can escape through the gap between upstream face 23 and seat ring 37 and flow into valve cavity 15. The stem seal will prevent fluids from escaping from the valve cavity 15.

In order for downstream face 25 to sealingly engage downstream seat ring 39, valve member 21 needs to be able to float within valve cavity 15 so that it is moveable along lateral axis 19 a sufficient amount to eliminate the gap between the sealing components of face 23, 25 and seat ring face 43. In order for valve member 21 to be able to float within valve cavity 15 so that it is moveable along lateral axis 19, end surface 50 of valve member 21 will be free of contact with opposite facing surface 52 of valve cavity 15. Therefore when valve stem 35 extends a maximum distance into bore 36 of valve member 21, gap 54 exists between end surface 50 of valve member 21 and opposite facing surface 52 of valve cavity 15 (FIG. 3).

Figure 2:
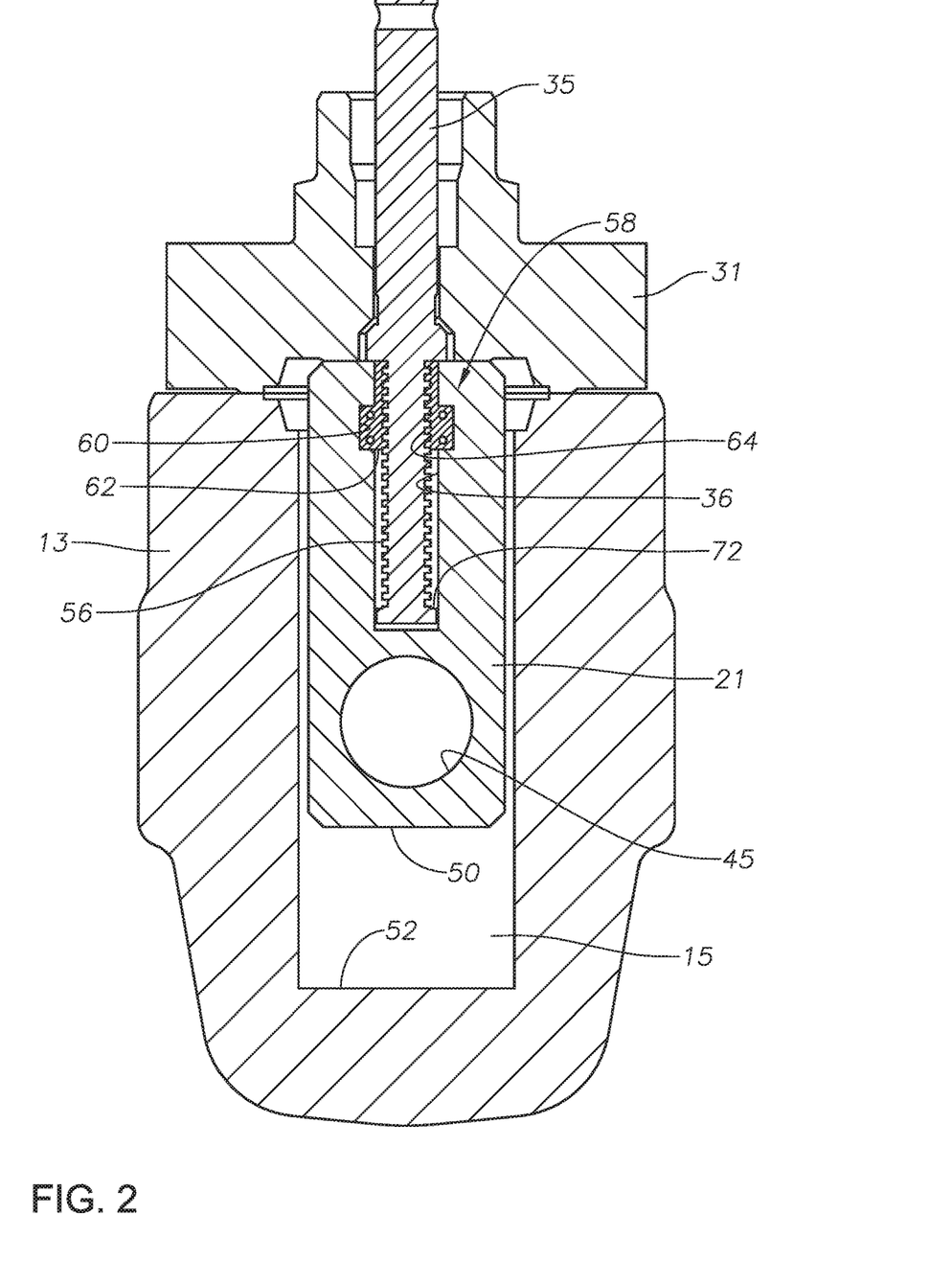
FIG. 2 is section view of a valve assembly, in accordance with an embodiment of this disclosure, shown with the valve member in the open position.

Looking at FIGS. 2-3, in order to convert rotational movement of valve stem 35 to axial movement of valve member 21 and move valve member 21 between the closed position and the open position, valve stem 35 is threadingly connected to valve member 21. Valve stem 35 can have external threads 56 on an outer diameter surface of valve stem 35. Bore 36 of valve member 21 has an inner diameter that is greater than the outer diameter of external threads 56 so that valve stem 35 can move axially within bore 36 without external threads 56 engaging the inner diameter of bore 36. Bore 36 must have a large enough internal diameter to not only allow external threads 56 to move within bore 36, but the internal diameter of bore 36 must also be large enough to allow valve member 21 to float around valve stem 35.

Collar assembly 58 can be located within slot 60 of valve member 21. Slot 60 of valve member 21 can have an inverted "T" shape and extend through valve member 21 from upstream face 23 to downstream face 25 (FIG. 1). Collar assembly 58 includes annular collar shoulder 62. Collar shoulder 62 extends from slot 60 into bore 36 and faces towards opposite facing surface 52 of valve cavity 15 and towards the bottom of bore 36.

Collar assembly 58 circumscribes valve stem 35 and has internal threads 64. Internal threads 64 engage external threads 56 of valve stem 35. Internal threads 64 can be sized and oriented to match external threads 56 of a particular valve stem 35 by selecting or customizing a particular collar assembly 58, without having to change other features of valve assembly 11. The interaction of internal threads 64 of collar assembly 58 and external threads 56 of valve stem 35 provides for the rotation of valve stem 35 to be translated to axial movement of valve member 21 along valve axis 29 between the open and closed positions.

Figure 4:
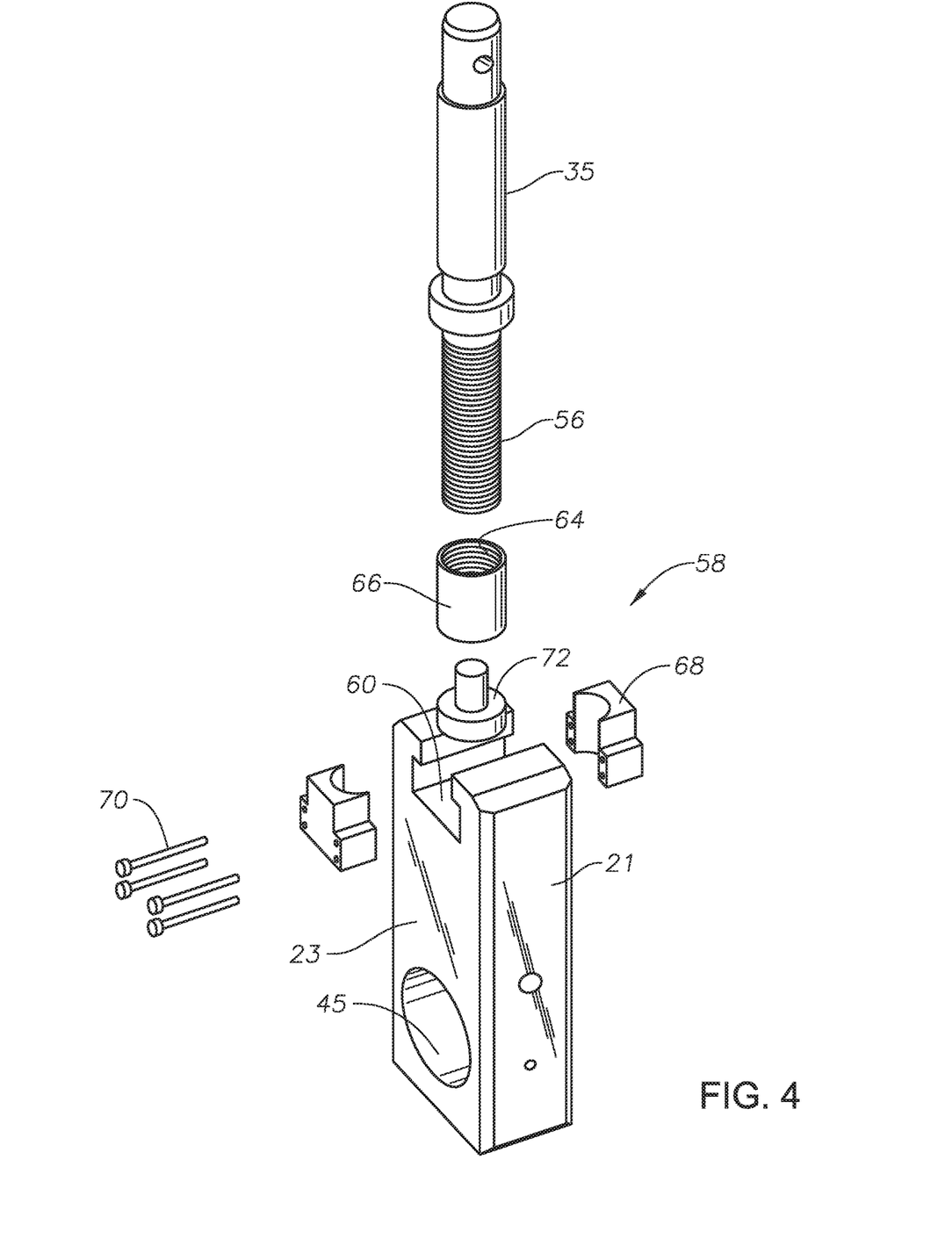
FIG. 4 is an exploded perspective view of a portion of a valve assembly, in accordance with an embodiment of this disclosure.

In the embodiment of FIG. 4, collar assembly 58 includes sleeve 66 that has internal threads 64. Sleeve 66 threadingly engages valve stem 35. Sleeve 66 is retained within collar 68. Sleeve 66 can have an external profile that engages an inner profile of collar 68 so that sleeve 66 cannot rotate relative to collar 68. If internal threads 64 are subjected to excessive wear or otherwise need to be replaced, an operator can simply remove collar 68 and provide a new collar 68 without needing to replace other components of valve assembly 11.

Collar 68 is a split collar with two or more segments that are releasably secured to each other to circumscribe both sleeve 66 and valve stem 35. In the example of FIG. 4, threaded connectors 70 are used to releasably secure two halves of collar 68 to each other. In alternate embodiments, other known connector types can be used. Collar 68, sleeve 66, and valve stem 35 are concentrically oriented around valve axis 29 (FIG. 1). Collar 68 can have an inverted "T" profile that corresponds to the profile of slot 60 so that collar 68 can be slid into slot 60 in a direction generally parallel to lateral axis 19 and allow the valve member 21 to move axially along the bore 17 axis 19. (FIG. 1).

Figure 5:
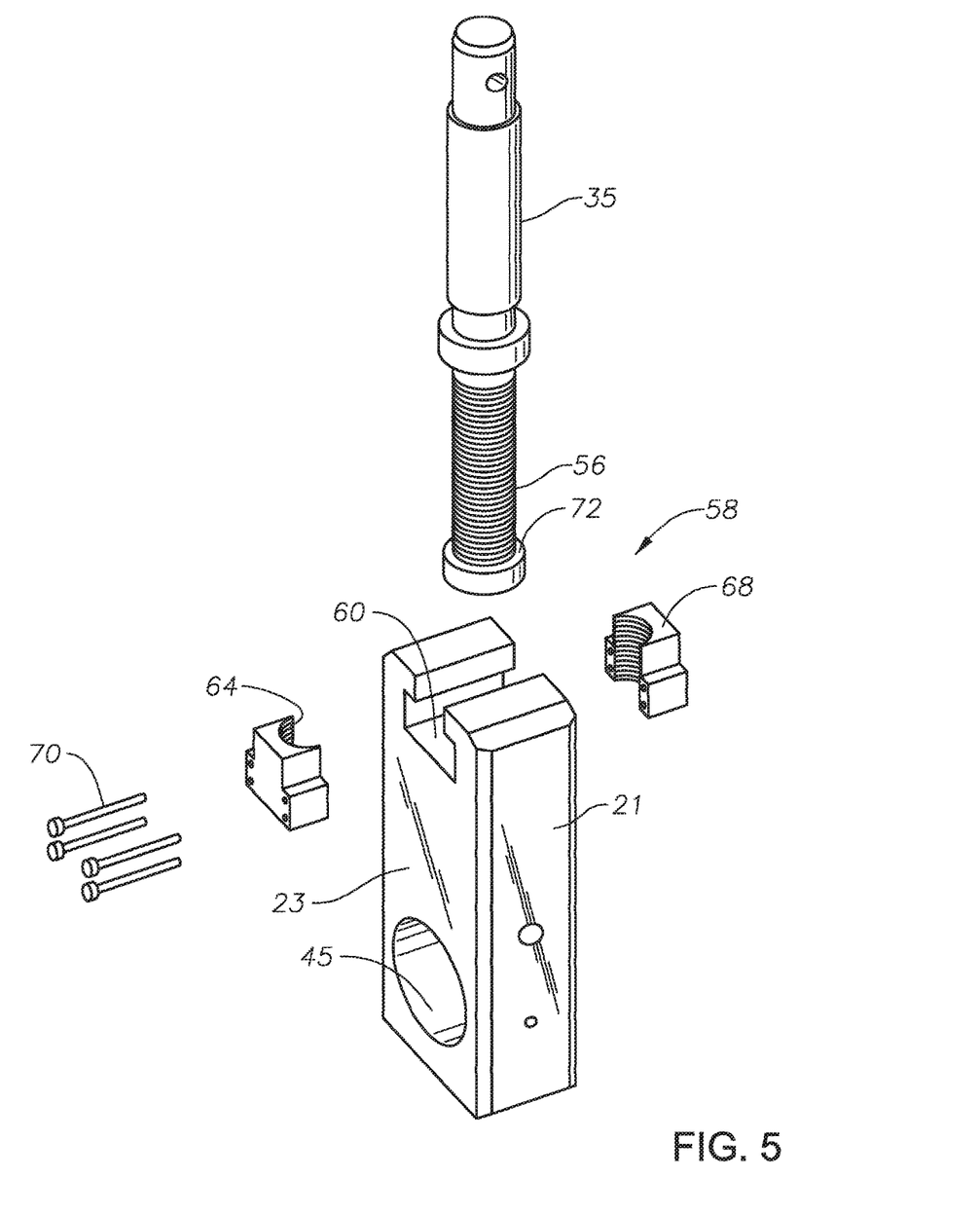
FIG. 5 is an exploded perspective view of a portion of a valve assembly, in accordance with an embodiment of this disclosure.

In the embodiment of FIG. 5, collar assembly 58 includes collar 68 that is a split nut. In such an embodiment, internal threads 64 are formed directly on an inner diameter surface of collar 68 and no separate sleeve 66 is used.

Looking at FIGS. 4-5, valve stem 35 has annular load shoulder 72. Load shoulder 72 faces in an opposite direction of collar shoulder 62 and is sized to engage collar shoulder 62. Load shoulder 72 will engage collar shoulder 62 when valve stem 35 extends a minimum distance into bore 36 of valve member 21, limiting axial movement of valve member 21. In the embodiment of FIG. 4, because collar 68 has internal threads 64 that are sized to engage external threads 56 of valve stem 35, collar 68 is too small to fit over load shoulder 72. Therefore in such an embodiment, load shoulder 72 is part of a separate member that is releasable secured to an end of valve stem 35. In the embodiment of FIG. 5, load shoulder 72 is instead integrally formed with valve stem 35. In the embodiment of FIG. 5, load shoulder 72 could alternately be part of a separate member that is releasable secured to an end of valve stem 35.

Load shoulder 72 is positioned so that when load shoulder 72 engages collar shoulder 62, gap 54 exists between end surface 50 of valve member 21 and opposite facing surface 52 of valve cavity 15 (FIG. 3). In this way, when valve stem 35 extends a minimum distance into bore 36 of valve member 21, end surface 50 of valve member 21 is free of contact with opposite facing surface 52 of valve cavity 15 and valve member 21 is free to float and be moveable along lateral axis 19 a sufficient amount so that downstream face 25 can sealingly engage downstream seat ring 39. Downstream face 25 should be generally parallel to seat ring face 43 in order for a sufficient seal to be formed between valve member 21 and seat ring 39. In the example of FIG. 3, when load shoulder 72 engages collar shoulder 62, valve member 21 is in the closed position.

In an example of operation, in order to open or close valve assembly 11, an operator can rotate valve stem 35 to move valve member 21 in a direction along valve axis 29. As an example, an operator can utilize hand wheel 33 to rotate valve stem 35. As the operator rotates valve stem 35, valve member 21 can move towards a closed position where valve stem 35 extends a minimum distance into bore 36 of valve member 21. When valve assembly 11 is in a fully closed position, load shoulder 72 will engage collar shoulder 62 so that the operator cannot move valve member 21 any further towards opposite facing surface 52 of valve cavity 15. End surface 50 of valve member 21 is therefore always free of contact with opposite facing surface 52 of valve cavity 15. In this way, valve member 21 is free to float when valve member 21 is in the closed position, and is moveable along lateral axis 19 a sufficient amount so that downstream face 25 can sealingly engage downstream seat ring 39.

The valve assembly described herein has significant advantages. As an example, embodiments of this disclosure provide a simplified system and method for operating valve assembly 11 in a manner that ensures that valve member 21 is sufficiently free of contact with valve body 13 so that valve member 21 can float within valve cavity 15 and form a seal at a downstream side of valve member 21.

The terms "vertical", "horizontal", "upward", "downward", "above", and "below" are used herein only for convenience because valve assembly 11 may be installed in various positions, other than with valve stem 35 pointing upward.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A valve assembly, comprising:
  a valve body with a flow passage intersected by a valve cavity;
  a valve member axially movable in the valve cavity between a closed position and an open position, the valve member having an opening that aligns with the flow passage when the valve member is in the open position;
  a valve stem threadingly connected to the valve member, the valve stem rotatable to move the valve member between the closed position and the open position;
  a collar assembly located within a slot of the valve member and circumscribing the valve stem, the collar assembly having an annular collar shoulder and a sleeve circumscribed by a collar, the sleeve being rotationally static relative to the collar and having internal threads that engage external threads of the valve stem; and wherein the valve stem has an annular load shoulder sized to engage the collar shoulder, limiting axial movement of the valve member.

2. The valve assembly of claim 1, wherein the load shoulder of the valve stem is positioned to engage the collar shoulder to define a gap between an end surface of the valve member and an opposite facing surface of the valve cavity.

3. The valve assembly of claim 1, wherein the valve stem extends a minimum distance into a bore of the valve member when the valve member is in the closed position and extends a maximum distance into the bore of the valve member when the valve member is in the open position.

4. The valve assembly of claim 1, wherein the valve member is a gate with a gate body, the gate body having a downstream face, and an upstream face on an opposite side of the gate body from the downstream face, wherein the downstream face sealingly engages a downstream seat ring.

5. The valve assembly of claim 1, wherein the slot extends through the valve member from an upstream face of the valve member to a downstream face of the valve member.

6. A valve assembly, comprising:
a valve body with a flow passage intersected by a valve cavity;
a gate with a valve axis, and a gate body, the gate body having a downstream face, and an upstream face on an opposite side of the gate body from the downstream face, the gate being axially movable in the valve cavity between a closed position and an open position, the gate having a gate opening that aligns with the flow passage when the gate is in the open position;
a valve stem threadingly connected to the gate, the valve stem rotatable to move the gate between the closed position and the open position;
a collar assembly located within a slot of the gate and circumscribing the valve stem, the collar assembly having an annular collar shoulder and a sleeve circumscribed by a collar, the sleeve being rotationally static relative to the collar and having internal threads that engage external threads of the valve stem; and
wherein the valve stem has an annular load shoulder sized to selectively engage the collar shoulder, limiting axial movement of the gate; and
an end surface of the gate is free of contact with an opposite facing surface of the valve cavity when the load shoulder engages the collar shoulder.

7. The valve assembly of claim 6, wherein when the load shoulder engages the collar shoulder, the gate is in the closed position.

8. The valve assembly of claim 6, wherein the valve stem extends a minimum distance into a bore of the gate when the gate is in the closed position and extends a maximum distance into the bore of the gate when the gate is in the open position.

9. The valve assembly of claim 6, wherein the downstream face sealingly engages a downstream seat ring.

10. The valve assembly of claim 6, wherein the slot extends through the gate from the upstream face of the gate to the downstream face of the gate.

11. A method of operating a valve assembly, the method comprising:
providing a valve body with a flow passage intersected by a valve cavity, a valve member positioned within the valve cavity, a valve stem threadingly connected to the valve member, and a collar assembly located within a slot of the valve member and circumscribing the valve stem, the collar assembly having an annular collar shoulder;
providing the collar assembly with a sleeve circumscribed by a collar, the sleeve being rotationally static relative to the collar and having internal threads that engage external threads of the valve stem;
rotating the valve stem to move the valve member axially within the valve cavity between a closed position and an open position, the valve member having an opening that aligns with the flow passage when the valve member is in the open position; and
limiting axial movement of the valve member with an annular load shoulder of the valve stem that is sized to engage the collar shoulder.

12. The method of claim 11, further comprising defining a gap between an end surface of the valve member and an opposite facing surface of the valve cavity when the load shoulder of the valve stem engages the collar shoulder.

13. The method of claim 11, wherein the valve stem extends a minimum distance into a bore of the valve member when the valve member is in the closed position and extends a maximum distance into the bore of the valve member when the valve member is in the open position.

14. The method of claim 11, wherein the flow passage has a lateral axis and the valve member is moveable along the lateral axis when the valve member is in the closed position.

* * * * *